United States Patent
Chao et al.

(10) Patent No.: US 10,212,078 B2
(45) Date of Patent: Feb. 19, 2019

(54) ENABLING NETWORK SERVICES IN MULTI-TENANT IAAS ENVIRONMENT

(71) Applicant: International Business Machines Corporation, Armonk, NY (US)

(72) Inventors: Chih-Wen Chao, Taipei (TW); Cheng-Ta Lee, Taipei (TW); Wei-Shiau Suen, Taichung (TW); Ming-Hsun Wu, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 14/794,875

(22) Filed: Jul. 9, 2015

(65) Prior Publication Data

US 2017/0012872 A1    Jan. 12, 2017

(51) Int. Cl.
*H04L 12/721* (2013.01)
*H04L 12/713* (2013.01)

(52) U.S. Cl.
CPC ............ *H04L 45/70* (2013.01); *H04L 45/586* (2013.01); *H04L 45/72* (2013.01)

(58) Field of Classification Search
CPC .............................. H04W 28/08; H04W 24/10
See application file for complete search history.

(56) References Cited

U.S. PATENT DOCUMENTS

| | | | |
|---|---|---|---|
| 8,239,509 B2 | 8/2012 | Ferris et al. | |
| 8,743,885 B2 | 6/2014 | Khan et al. | |
| 9,467,395 B2 * | 10/2016 | Schmidt | H04L 47/827 |
| 2013/0024573 A1 | 1/2013 | Kushida et al. | |
| 2013/0111349 A1 | 5/2013 | Yan et al. | |
| 2013/0347095 A1 * | 12/2013 | Barjatiya | H04L 63/0209 726/13 |
| 2014/0052877 A1 * | 2/2014 | Mao | H04L 61/103 709/245 |
| 2014/0108665 A1 * | 4/2014 | Arora | H04L 67/141 709/227 |
| 2014/0115584 A1 * | 4/2014 | Mudigonda | H04L 67/1095 718/1 |
| 2014/0126418 A1 * | 5/2014 | Brendel | H04L 12/4641 370/254 |

(Continued)

FOREIGN PATENT DOCUMENTS

WO    2014088541 A1    6/2014

OTHER PUBLICATIONS

Claims 1, 2 and 3 amendments as filed by the applicant on Sep. 12, 2018.*

(Continued)

*Primary Examiner* — Xavier Szewai Wong
(74) *Attorney, Agent, or Firm* — Edward J. Wixted, III

(57) ABSTRACT

Methods, systems, and computer program products for enabling network services in a multi-tenant IaaS environment are provided. A service portal is deployed in the IaaS environment. In one embodiment, tenant packet associated with a first tenant of the IaaS environment is received by the service portal. The tenant packet is analyzed to identify one or more services to which to transmit the tenant packet. The tenant packet is distributed to the identified services for processing. A processed tenant packet is received from one or more of the identified services. The processed tenant packet is transmitted to a destination.

24 Claims, 6 Drawing Sheets

(56) References Cited

U.S. PATENT DOCUMENTS

| | | | |
|---|---|---|---|
| 2014/0304387 A1 | 10/2014 | Bansal et al. | |
| 2015/0081882 A1* | 3/2015 | Bartucca | H04L 47/785 709/224 |
| 2015/0109995 A1* | 4/2015 | Mathai | H04L 61/1511 370/328 |
| 2015/0172321 A1* | 6/2015 | Kirti | H04L 63/1416 726/1 |
| 2015/0281171 A1* | 10/2015 | Xiao | H04L 47/70 709/225 |
| 2016/0072919 A1* | 3/2016 | Bailey | G06F 9/54 709/222 |
| 2016/0306647 A1* | 10/2016 | Xia | G06F 9/45558 |

OTHER PUBLICATIONS

"Virtualized Multi-Tenant Data Center Solution for Infrastructure-as-a-Service", CISCO, © 2010 Cisco and/or its affiliates, pp. 1-10, <http://www.cisco.com/c/en/us/solutions/collateral/data-center-virtualization/data-center-virtualization/white_paper_c11-604559.pdf>.

* cited by examiner

ENABLING NETWORK SERVICES IN MULTI-TENANT IAAS ENVIRONMENT

BACKGROUND OF THE INVENTION

The present invention relates generally to the field of multi-tenant IaaS environments, and more particularly to scalable service deployment in multi-tenant IaaS environments.

Infrastructure as a service (IaaS) is a type of cloud computing in which a third-party provider hosts virtual computing resources over the internet. Often, tenants of IaaS environments require the use of services. Services can include security, firewalls, captive portals, traffic analyzers, etc. Often times, the services are offered by third-party providers.

Service providers can provide services to tenants of various IaaS environments. The requirements of each of the various IaaS environments can hinder a service provider's ability to add services to the IaaS environment. Some requirements of the IaaS environment, such as privileges to access tenant information, can be difficult for service providers to incorporate into the interface of the service. The tenant information is typically stored in the tenant header of a tenant packet, and each IaaS environment can have different requirements as to what is included in the tenant header. The varying requirements can pose a problem for service providers servicing multiple IaaS environments, as the service provider interface must typically be able to accommodate each IaaS environment's requirements.

SUMMARY

According to one embodiment of the present invention, a method for enabling network services in a multi-tenant IaaS environment is provided. The method includes deploying a service portal in an IaaS environment. The service portal receives a tenant packet associated with a first tenant of the IaaS environment. The service portal analyzes the tenant packet to identify one or more services to which to transmit the tenant packet. The service portal distributes the tenant packet to the identified services for processing. The service portal receives a processed tenant packet from one or more of the identified services. The service portal transmits the processed tenant packet to a destination. The use of the service portal in the IaaS environment allows for scaling of services within an IaaS environment. Services can be expanded or reduced by adding a service portal to the IaaS environment. Further, the service portal is tenant aware and removes the need for tenant awareness by the service provider. The serve portal's tenant awareness provides a solution to service providers who are not permitted or capable of receiving tenant information.

In an embodiment of the invention the destination is a second tenant of the IaaS environment. In an alternative embodiment of the invention, the destination is the first tenant. In an aspect of the invention, analyzing the tenant packet to identify one or more services includes consulting a policy table, where the policy table includes one or more policies corresponding to the services, and determining the identified services based on the one or more policies. The use of the policy table allows services to be applied to both in-bound and out-bound tenant packets. In an embodiment of the invention, prior to the service portal distributing the tenant packet to the identified services, the service portal strips a tenant header from the tenant packet. In an embodiment of the invention, prior to transmitting the processed tenant packet to a destination, the service portal adds the tenant header to the processed tenant packet. The adding and removing of the tenant header allows the service to be fulfilled without requiring the service provider to have tenant awareness. Further, services can be applied to the tenant packet where the service provider does not have permission to access information in the tenant header. In one embodiment of the invention, distributing the tenant packet to the identified services includes sending the tenant packet to a first service of the identified services, receiving a processed tenant packet from the first, and sending the processed tenant packet to a second service of the identified services. In another embodiment of the present invention, distributing the tenant packet to the identified services includes sending the tenant packet to a first service of the identified services and a second service of the identified services and receiving a first processed tenant packet from the first service and a second processed tenant packet from the second service.

According to another embodiment of the present invention, a computer program product for enabling network services in a multi-tenant IaaS environment is provided. The computer program product comprises a computer readable storage medium and program instructions stored on the computer readable storage medium. The program instructions include program instructions to deploy a service portal in an IaaS environment. The program instructions include program instructions to receive a tenant packet associated with a first tenant of the IaaS environment. The program instructions include program instructions to analyze the tenant packet to identify one or more services to which to transmit the tenant packet. The program instructions include program instructions to distribute the tenant packet to the identified services for processing. The program instructions include program instructions to receive a processed tenant packet from one or more of the identified services. The program instructions include program instructions to transmit the processed tenant packet to a destination.

In some aspects of the invention, the program instructions for analyzing the tenant packet include program instructions to consult a policy table and determine identified services based on the one or more policies. In some embodiments of the invention, where the program instructions are stored on the computer readable storage medium, program instructions include program instructions to, prior to distributing the tenant packet to the identified services, strip a tenant header from the tenant packet. In some embodiments of the invention, where the program instructions are stored on the computer readable storage medium, program instructions include program instructions to, prior to transmitting the processed tenant packet to the destination, add the tenant header to the processed tenant packet.

According to another embodiment of the present invention, a computer system for enabling network services in a multi-tenant IaaS environment is provided. The computer system includes one or more computer processors, one or more computer readable storage media, and program instructions stored on the computer readable storage media for execution by at least one of the one or more processors. The program instructions include program instructions to deploy a service portal in an IaaS environment. The program instructions include program instructions to receive a tenant packet associated with a first tenant of the IaaS environment. The program instructions include program instructions to analyze the tenant packet to identify one or more services to which to transmit the tenant packet. The program instructions include program instructions to distribute the tenant packet to the identified services for processing. The program instructions include program instructions to receive a processed tenant packet from one or more of the identified services. The program instructions include program instructions to transmit the processed tenant packet to a destination.

In some aspects of the invention, the program instructions for analyzing the tenant packet include program instructions to consult a policy table and determine identified services based on the one or more policies. In some embodiments of the invention, where the program instructions are stored on the computer readable storage medium, program instructions include program instructions to, prior to distributing the tenant packet to the identified services, strip a tenant header from the tenant packet. In some embodiments of the invention, where the program instructions are stored on the computer readable storage medium, program instructions include program instructions to, prior to transmitting the processed tenant packet to the destination, add the tenant header to the processed tenant packet.

DETAILED DESCRIPTION

An embodiment of the present invention recognizes that adding new services to an IaaS environment can be difficult due to limitations in network infrastructure. To deploy these services within the IaaS environment, the network infrastructure typically has to be altered to allow some traffic to pass through the service. Service providers don't have privileges to alter the network infrastructure. Also, it can be difficult for the IaaS infrastructure to provide special interfaces for each service. As a result, service providers have to create architecture(s) that will work with IaaS environments. In some cases, service providers have to create generic architecture that will work with multiple IaaS environments. In other cases, service providers have to create customized or individual architecture for each IaaS environment.

An embodiment of the present invention provides a bridge, or service portal, between the IaaS environment and service providers. The service portal removes limitations of the network infrastructure. The service portal provides a uniform interface to the IaaS environment and a customizable interface to the service provider. The service portal allows for expansion of services within an IaaS environment and scalability of existing services. Any service can be added or scaled in the IaaS environment by adding a service portal. Further, from a services point of view, the service can be provided to any IaaS environment utilizing service portals. The service portal behaves as a tenant awareness appliance, minimizing the requirements needed by the service providers.

Figure 1:
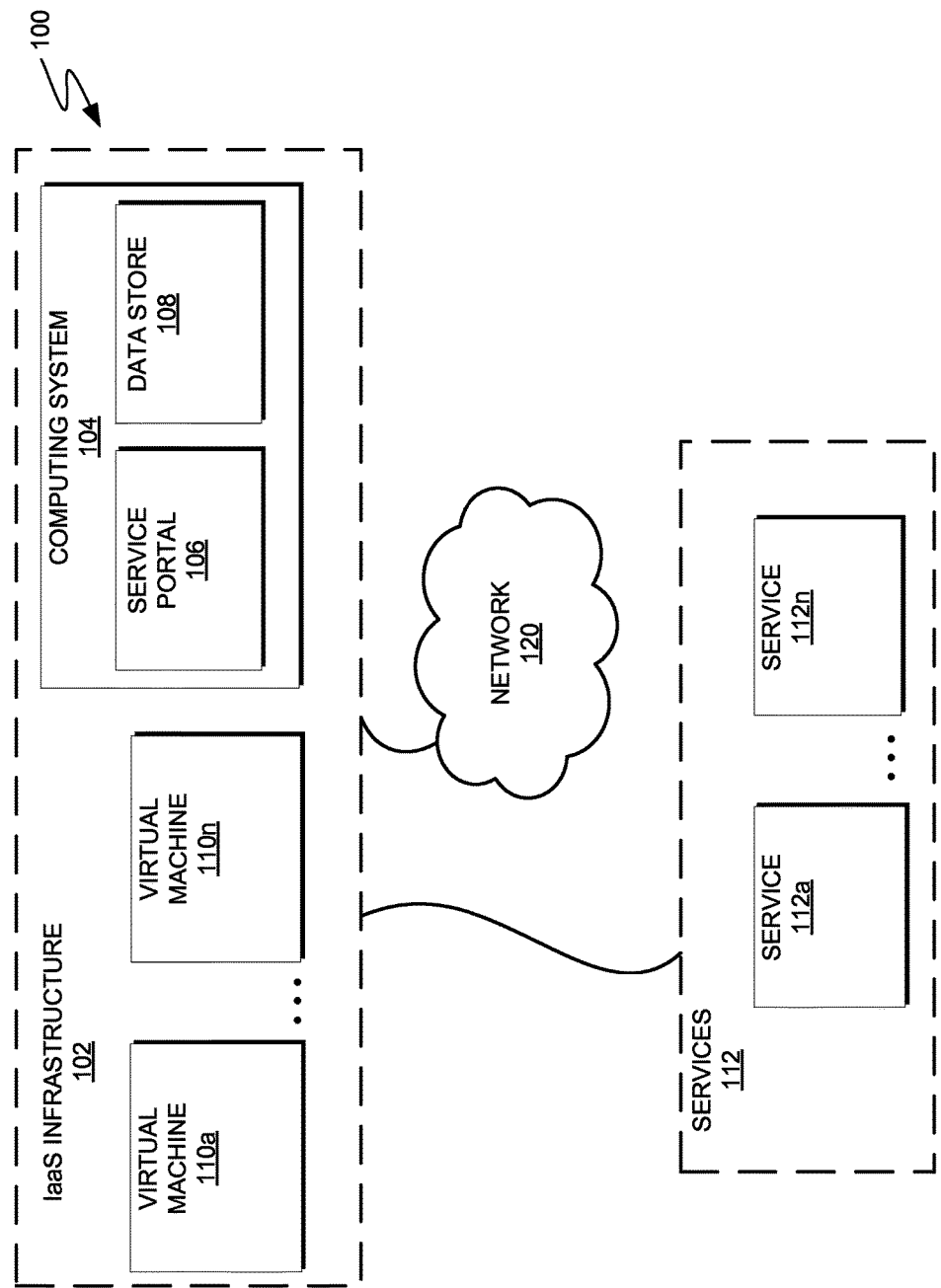
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes IaaS infrastructure 102 and services 112. IaaS infrastructure is connected to service 112 and network 120.

In various embodiments, IaaS infrastructure 102 is a network of computing systems arranged to provide computing resources to tenants in a virtualized environment. IaaS infrastructure 102 includes computing system 104 and virtual machine 110a through virtual machine 110n.

In various embodiments, computing system 104 is a computing device that can be a standalone device, a server, a laptop computer, a tablet computer, a netbook computer, a personal computer (PC), or a desktop computer. In another embodiment, computing system 104 represents a computing system utilizing clustered computers and components to act as a single pool of seamless resources. In general, computing system 104 can be any computing device or a combination of devices with access to some or all of virtual machine 110a through virtual machine 110n and services 112; and with access to and/or capable of operating service portal 106 and data store 108. Computing system 104 may include internal and external hardware components, as depicted and described in further detail with respect to FIG. 6.

In this exemplary embodiment, service portal 106 and data store 108 are stored on computing system 104. In other embodiments, one or both of service portal 106 and data store 108 may reside on another computing device, provided that each can access and is accessible by each other of service portal 106 and data store 108 and virtual machine 110a through virtual machine 110n and service 112. In yet other embodiments, one or both of service portal 106 and data store 108 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between IaaS infrastructure 102 and other devices, in accordance with a desired embodiment of the present invention. IaaS infrastructure 102 is operatively connected to service 112. For example, the connection between IaaS infrastructure 102 and services 112 may include wired, wireless, fiber optic or any other connection known in the art.

Service portal 106 operates to provide a uniform interface for data exchange between IaaS infrastructure 102 and services 112. In some embodiments, IaaS infrastructure 102 has a single service portal 106. For example, service portal 106 can be owned and operated by the IaaS provider. In these embodiments, a request for a service of services 112 (e.g., service 112a) from a tenant of IaaS infrastructure 102 is received by service portal 106. Service portal 106 determines which service 112 is being requested and directs the tenant packet to the appropriate service provider. In response, service portal 106 receives fulfilled service requests from services 112 and directs the service data to the appropriate tenant of IaaS infrastructure 102.

In some embodiments, IaaS infrastructure 102 has more than one service portal 106. For example, each service 112a through 112n can have its own service portal 106, where each service portal 106 is owned by a respective service provider. In these embodiments, a request for a service of services 112 (e.g., service 112a) is made by a tenant of IaaS infrastructure 102. The request is sent to service portal 106 of the service provider providing service 112a. Service portal 106 processes the request and sends the request to service 112a. Service portal 106 receives the service data and directs it to the appropriate tenant of IaaS infrastructure 102. Multiple service portals 106 provides a mechanism for new services to be added to IaaS infrastructure 102. A new service portal 106 can be added for each new service. Multiple service portals 106 also provides a means for existing service providers to scale, as a service provider can add or remove service portals 106 as the service load fluctuates. In another embodiment with more than one service portal 106, each service portal 106 supports more than one service 112. For example, where a service provider provides multiple services 112 to tenants of IaaS infrastructure 102, the service provider can use a single service portal 106 to interface with IaaS infrastructure 102. In some embodiments, where service portal 106 is owned by the service provider, service portal 106 is located in service 112.

Data store 108 operates to provide a table mapping of incoming and outgoing service requests for tenants of IaaS infrastructure 102. Data store 108 may be written to or read by service portal 106. In some embodiments, service portal 106 stores a table mapping of each tenant and service instance on data store 108. Included in the table mapping is tenant header information stripped from the tenant packet before the packet can be delivered to services 112. In some embodiments, data store 108 stores subscription statuses and policies. In some embodiments, the table mapping is used by service 112 to track tenant usage (e.g., for billing purposes).

Virtual machine 110a through virtual machine 110n operates to provide computing resources to tenants of IaaS infrastructure 102. Virtual machine 110a through virtual machine 110n are hosted by computer systems within IaaS infrastructure. In some embodiments, each virtual machine 110a through 110n is stored on a single computer system. In other embodiments, virtual machine 110a through virtual machine 110n are stored across multiple computer systems. Each virtual machine 110a through 110n is a tenant of IaaS infrastructure 102 and can be used (e.g., by one or more users or applications) for various computing tasks in which data packets are transmitted and received. Requests for services 112 are sent from a virtual machine (e.g., virtual machine 110a). Fulfilled service requests are directed to the virtual machine that sent the request for services 112. For example, virtual machine 110a makes a request for service 112a. The request is processed by service portal 106 and sent to service 112a for fulfillment. Service portal 106 receives the fulfilled service request from service 112a and directs it to virtual machine 110a.

In various embodiments of the present invention, services 112 operate to provide computing services to tenants of an IaaS infrastructure 102. In some embodiments, each service (e.g., service 112a) of services 112 offers a distinct service to tenants of IaaS infrastructure 102. For example, services 112 can include captive portals, traffic analyzers, traffic monitors, firewalls, security features, etc.

Figure 2:
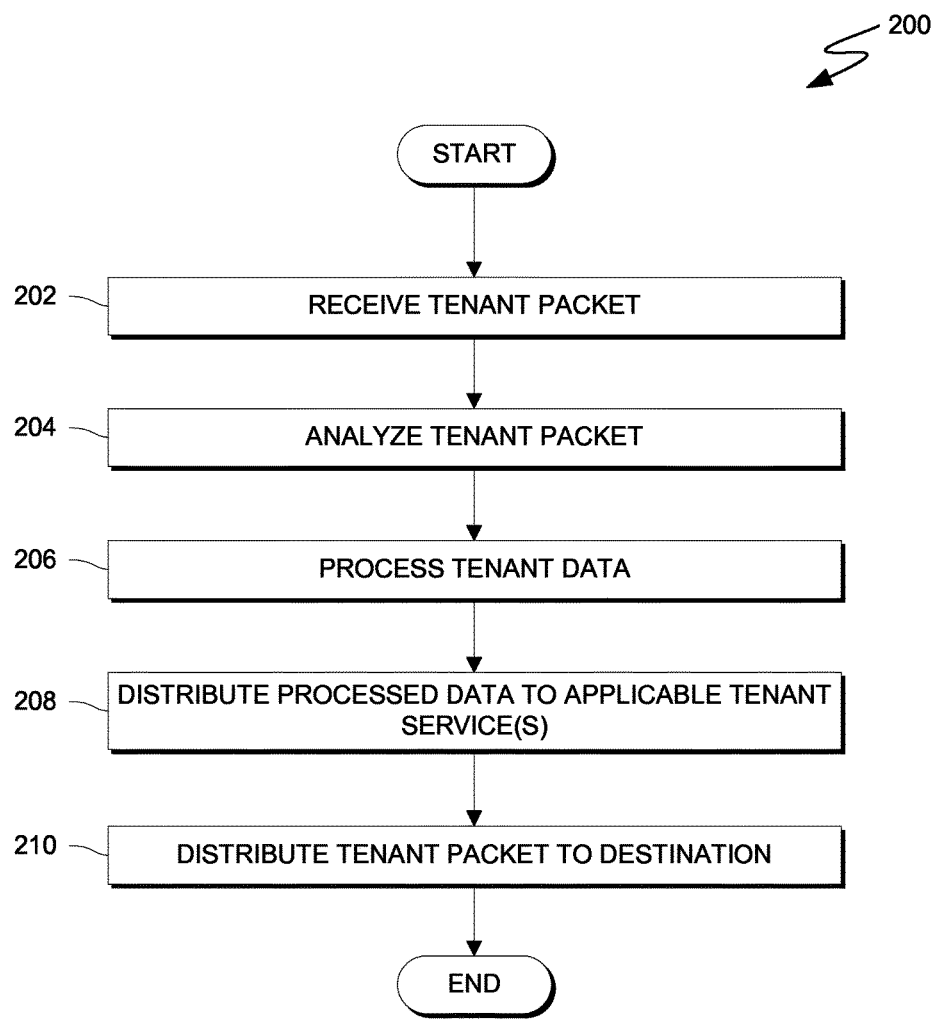
FIG. 2 is a flowchart depicting operations for enabling network services in multi-tenant IaaS environments, on a computing device within the computing environment of FIG. 1, in accordance with an embodiment of the present invention.

FIG. 2 is a flowchart depicting operations for enabling network services in multi-tenant IaaS environments, on a computing device within the computing environment of FIG. 1, in accordance with an embodiment of the present invention. For example, FIG. 2 is a flowchart depicting operations 200 of service portal 106, on computing system 104 within computing environment 100.

In some embodiments, operations 200 are deployed in a service portal in the IaaS infrastructure. Deploying can involve installing one or more applications on one or more computer systems of the IaaS infrastructure, or otherwise configuring one or more computer systems of the IaaS infrastructure to serve as a service portal. In some embodiments, service portal operators (i.e., the entity who deploys the service portals) can be tenants themselves. For example, service portal operators can purchase or configure one or more virtual machines for the purpose of creating a service portal on hardware of the IaaS infrastructure. In other embodiments, service portals may alternatively be deployed in a different layer of the IaaS infrastructure, such as a management layer requiring elevated privileges beyond those of a typical tenant. In still other embodiments, service portals may be deployed and operated by the IaaS infrastructure provider.

In step 202, service portal 106 receives a tenant packet. A tenant packet can be in an in-bound or out-bound data packet. For example, the tenant packet can be in-bound data packet sent to a tenant of the IaaS infrastructure from another source. In another example, the tenant packet can be an out-bound data packet sent from the tenant to another source. Tenant packets are directed to service portal 106 based on one or more policies. The policies can be established by the IaaS provider or the tenant. For example, the tenant can have a subscription service to a firewall service. In this example, any incoming or outgoing tenant packets are first routed to service portal 106, which will send the tenant packet to the firewall service before it is routed to the final destination.

A tenant packet includes a tenant header. In some embodiments, the tenant header includes the address of the sender, the destination, and other information used for identifying the tenant. The tenant header is used to route the tenant packet to appropriate services, based on IaaS provider and tenant policies. Service portal 106 intercepts the header information and uses the header information to direct the tenant packet to services specified by one or more tenant policies. Service portal 106 removes the header information (step 206) before directing the tenant packet to the service instance. In some embodiments, the service provider is not privileged to the tenant information. In other embodiments, the service provider does not have tenant awareness and cannot read the tenant information.

In step 204, service portal 106 analyzes the tenant packet. Service portal 106 analyzes the tenant packet to determine whether to route the tenant packet to one or more services prior to routing the tenant packet to its destination. In some embodiments, analyzing the tenant packet includes referencing a policy table to determine whether a service instance is applicable. For example, where the IaaS infrastructure has a single service portal 106, service portal 106 determines which services are required, based on the policy table. In some embodiments, service portal 106 references the data store to determine subscription status and policies. For example, the IaaS provider may require the tenant packet be run through a security service prior to being sent to the final destination.

In step 206, service portal 106 processes tenant packet. Service portal 106 removes tenant data from the tenant packet prior to sending the packet to the service. Tenant data includes the tenant header. In some embodiments, service providers do not have privileges to view the information in the tenant header. In other embodiments, the service provider is not tenant aware, such that the service provider is unable to track the tenant's service usage via the tenant header. The tenant header is stored in a data store and used to match the service data to the tenant packet after the service request is processed. In some embodiments, the tenant header is used within the data store to track the tenant's service usage.

In step 208, service portal 106 distributes processed data to applicable service(s). The processed tenant packet (i.e., the tenant packet without the tenant header) is sent to the service instance(s) identified in step 204. The service instance fulfills the service request. The service returns the tenant packet with data fulfilling the request made by service portal 106. In some embodiments, the returned tenant packet is different from the processed tenant packet sent by service portal 106 to the service. For example, where the service is data encryption, the data in the processed tenant packet will be different than the data in the returned packet. In other embodiments, the returned tenant packet will be identical to the processed tenant packet sent to the service by service portal. For example, where the service is a security feature and the processed tenant packet does not pose a security risk, the data can return to service portal 106 unaltered. Service portal 106 references the data store to match the tenant request with the service packet. Service portal 106 adds the tenant header back onto the tenant packet.

In some embodiments, the processed tenant packet is sent to more than one service. For example, where service portal 106 interfaces with multiple services, service portal 106 can send the processed service packets to multiple services. In some embodiments, the requests are sent consecutively. For example, where four services are identified in step 204, service portal 106 issues the processed tenant packet to four services at the same time. In other embodiments, service portal 106 issues the service requests in sequence. For example, where four services are identified in step 204, service portal sends a request to the first service and waits for a response before sending the request for the second service. Sequential requests can be used for varied layers of security services.

In some embodiments, the multiple services are identified in step 204 that are serviced by more than one service portal 106. In these embodiments, the processed tenant packet is sent to the respective service portal 106 for each identified service.

In step 210, service portal 106 distributes the tenant packet to the destination. The destination is determined by information in the tenant header. In some embodiments, a tenant of the IaaS infrastructure is the destination. For example, a source outside of the IaaS infrastructure sends an email to a tenant of the IaaS infrastructure. The email is sent through operations 200 before being delivered to the tenant. In other embodiments, the destination is located outside of the IaaS infrastructure. For example, a tenant of the IaaS infrastructure posts to a social media account. In this example, the post is sent through operations 200 before being displayed on the social media network.

Figure 3:
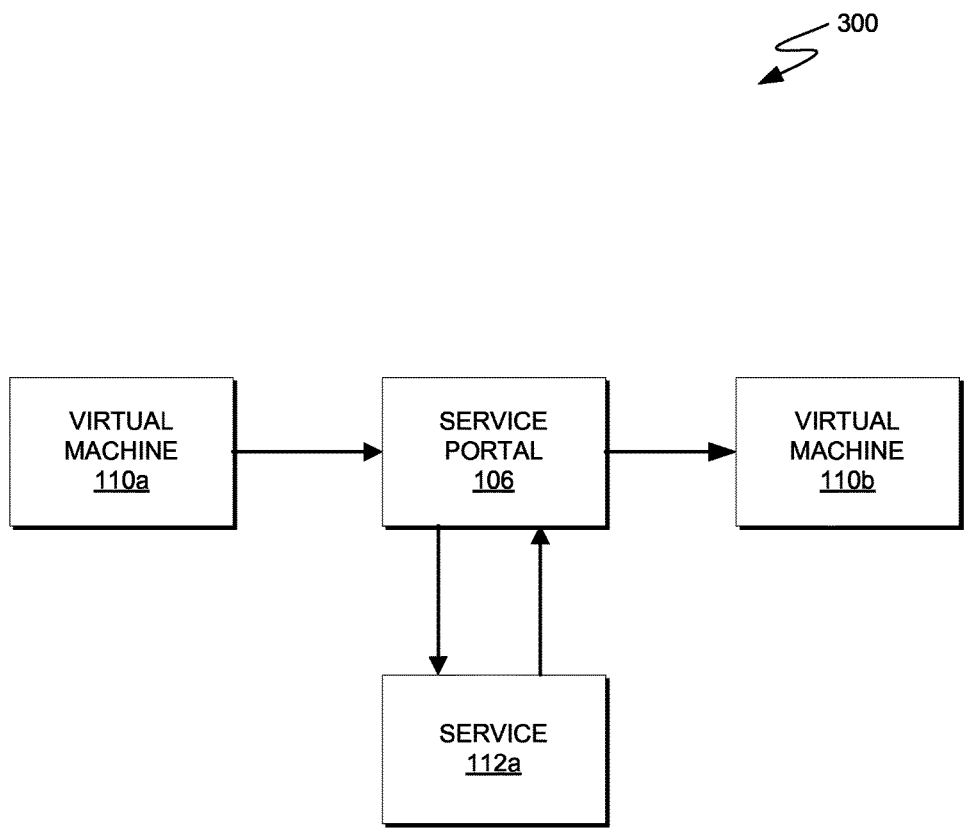
FIG. 3 is a diagram depicting data flow and interactions between components of FIG. 1 for processing intra-network requests/data traffic/data packets in an IaaS environment, in accordance with an embodiment of the present invention.

FIG. 3 is a flow diagram depicting operations for enabling intra-network services in IaaS environments, on a computing device within the computing environment of FIG. 1, in accordance with an embodiment of the present invention. For example, FIG. 3 is a flow diagram depicting data flow 300 to/from service portal 106, on computing system 104 within computing environment 100.

Data flow 300 is an embodiment of the present invention where a tenant of the IaaS infrastructure is sending data affected by services to another tenant of the IaaS infrastructure. In this embodiment, a tenant of virtual machine 110a makes a request for a service from service 112a. In some embodiments, the request from virtual machine 110a is an overt request for a service. In other embodiments, the request is consequence of policies for sending or receiving data from another tenant or network. For example, the IaaS provider can require tenant data be processed by a security service before it enters or leaves the IaaS infrastructure.

In one embodiment, service portal 106 performs operations on tenant data sent from virtual machine 110a before the date is sent to virtual machine 110b within the same IaaS infrastructure. For example, data flow 300 can be implemented where the IaaS infrastructure has a policy that data be processed by a security service (e.g., an intrusion prevention system (IPS) or a firewall) prior to being received by a tenant of the IaaS infrastructure. Data sent by virtual machine 110a is received by service portal 106. Service portal 106 processes the data, removing the tenant header and determining where to send the data. Service portal 106 sends the data to service 112a (e.g., an IPS). Service 112a returns the data to service portal 106. Service portal 106 references its table mapping to determine the owner of data and the destination. In response to determining that the data is a result of the request from virtual machine 110a, service portal 106 sends the data to virtual machine 110b.

In some embodiments, data flow 300 can be an example where a tenant of the IaaS infrastructure where the data affects the requesting tenant. For example, instead of sending data to virtual machine 110b, service portal 106 sends data from service 112 to virtual machine 110a.

Figure 4:
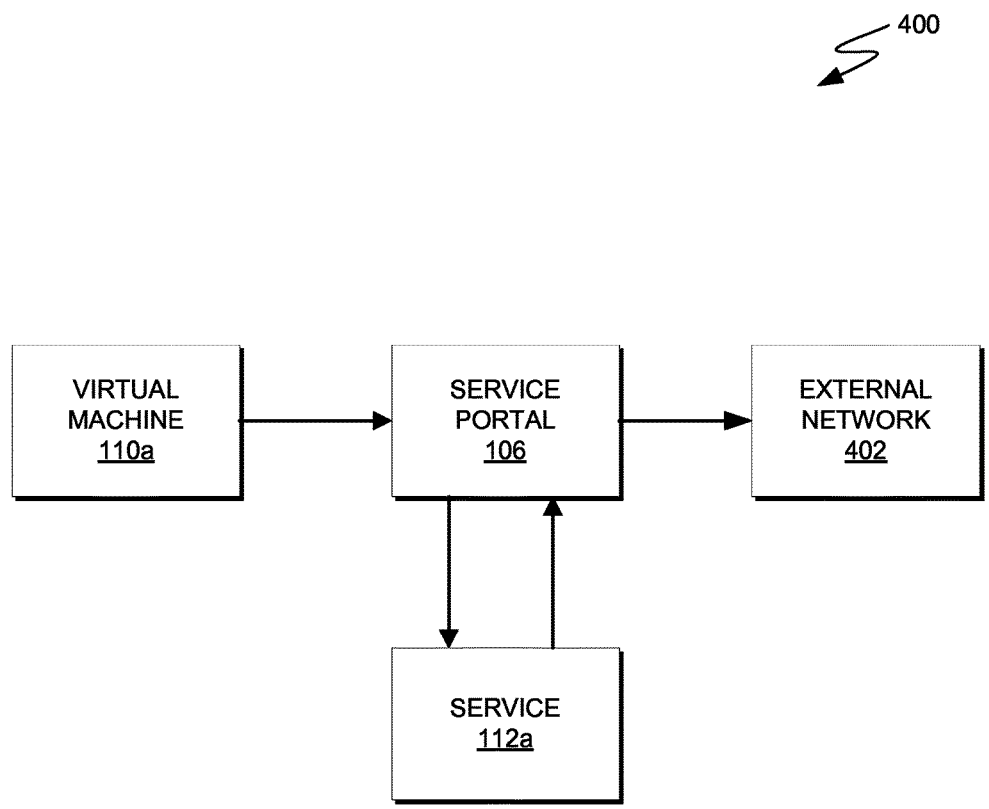
FIG. 4 is a diagram depicting data flow and interactions between components of the computing environment of FIG. 1 for processing outgoing requests/data traffic/data packets from an IaaS environment, in accordance with an embodiment of the present invention.

FIG. 4 is a flow diagram depicting operations for enabling outgoing services in IaaS environments, on a computing device within the computing environment of FIG. 1, in accordance with an embodiment of the present invention. For example, FIG. 3 is a flow diagram depicting data flow 400 to/from service portal 106, on computing system 104 within computing environment 100.

Data flow 400 is an embodiment of the present invention where a tenant of the IaaS infrastructure is sending data affected by services to an outside network. In some embodiments, the tenant of a virtual machine within the IaaS infrastructure sends data to a destination outside of the IaaS infrastructure. For example, a user who posts to a social media website. In some embodiments, the data is required to go through services before leaving the IaaS infrastructure. In this embodiment, a service portal in the tenant's IaaS infrastructure will receive the data, direct the data to the service, receive data from the service, and direct the service data to the outside source.

For example, as shown in FIG. 4, virtual machine 110a of the IaaS infrastructure sends data to service portal 106. In some embodiments, service portal 106 sends the data through a security feature, such as an IPS, firewall, etc. In other embodiments, service portal 106 directs the tenant data to another service such as a captive portal. Service portal 106 removes the tenant header and sends the data to service 112a. Service 112a fulfills the service request and sends the data back to service portal 106. Service portal 106 matches the service data to the service request and restores the tenant header. Service portal 106 then sends the service data to its destination, external network 402.

Figure 5:
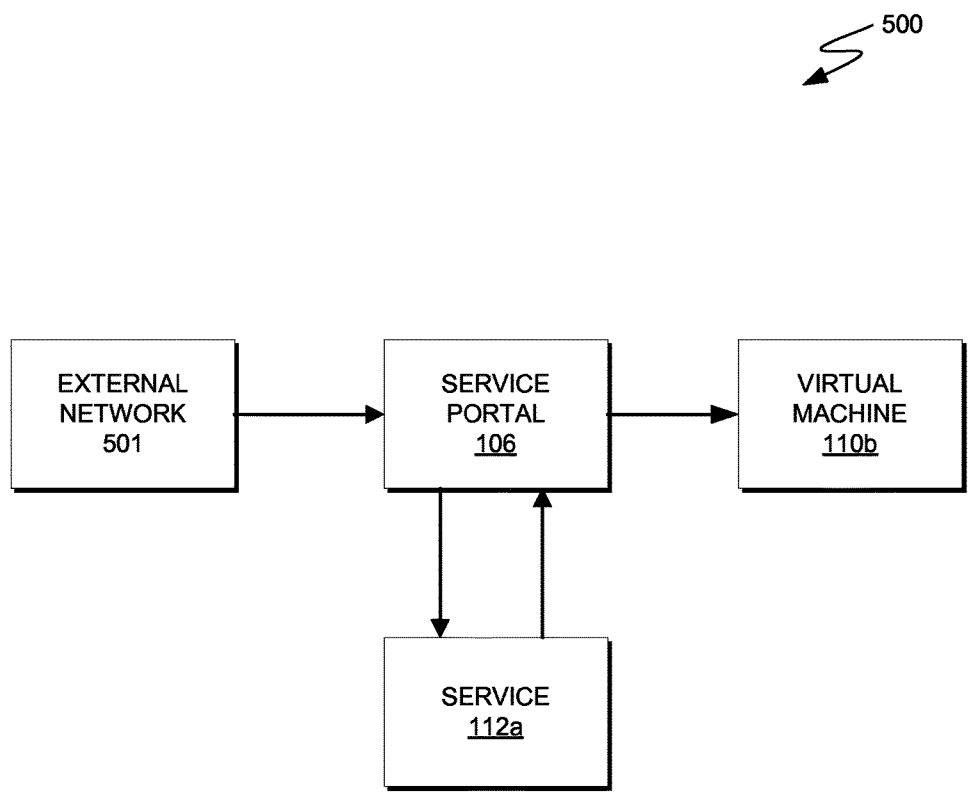
FIG. 5 is a diagram depicting data flow and interactions between components of the computing environment of FIG. 1 for processing incoming requests/data traffic/data packets into an IaaS environment, in accordance with an embodiment of the present invention.

FIG. 5 is a flowchart depicting operations for enabling incoming services in IaaS environments, on a computing device within the computing environment of FIG. 1, in accordance with an embodiment of the present invention. For example, FIG. 5 is a flowchart depicting data flow 500 to/from service portal 106, on computing system 104 within computing environment 100.

Data flow 500 is an embodiment of the present invention where an outside network is sending data affected by services to a tenant of the IaaS infrastructure. In some embodiments, a tenant of the IaaS infrastructure will receive data from an outside source. In these embodiments, either the tenant or the IaaS provider may want to send incoming data through security services to protect the infrastructure. In these embodiments, any data entering the IaaS infrastructure is directed to service portal 106 to be sent through security services.

External network 501 sends data to virtual machine 110*b*. The data is intercepted by service portal 106 prior to entering the IaaS infrastructure. Service portal 106 removes the header from the data and directs the data to service 112*a* (e.g., an ISP). After service 112*a* performs the security services, the data is sent back to service portal 106. Service portal 106 restores the header and directs the data to virtual machine 110*b*.

Figure 6:
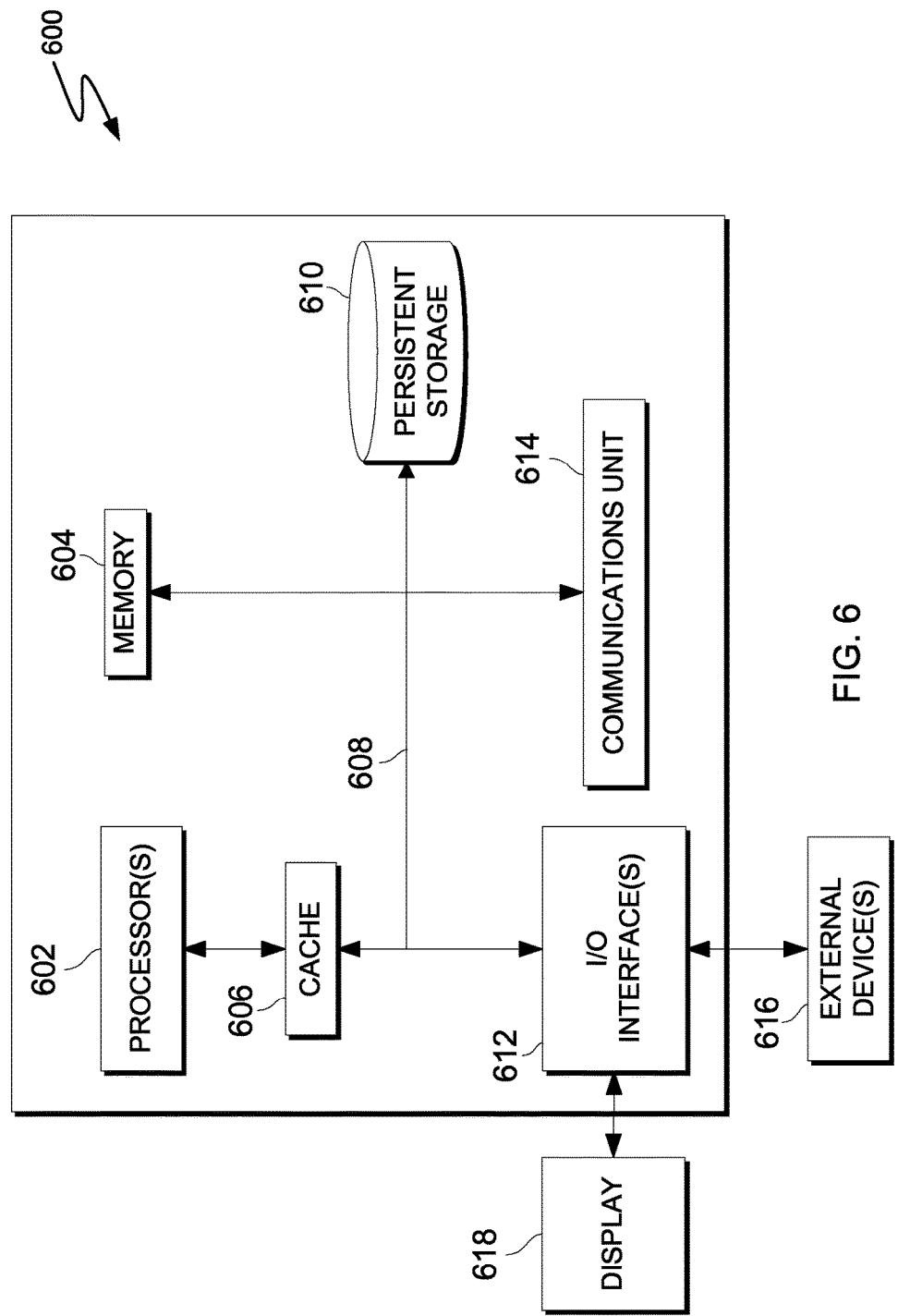
FIG. 6 is a block diagram of components of the computer systems of FIG. 1, in accordance with an embodiment of the present invention.

FIG. 6 is a block diagram of components of a computing device, generally designated 600, in accordance with an embodiment of the present invention. In one embodiment, computing device 600 is representative of computing system 104. For example, FIG. 6 is a block diagram of computing system 104 within computing environment 100 executing operations of service portal 106.

It should be appreciated that FIG. 6 provides only an illustration of one implementation and does not imply any limitations with regard to the environments in which different embodiments may be implemented. Many modifications to the depicted environment may be made.

Computing device 600 includes communications fabric 608, which provides communications between computer processor(s) 602, memory 604, cache 606, persistent storage 610, communications unit 614, and input/output (I/O) interface(s) 612. Communications fabric 608 can be implemented with any architecture designed for passing data and/or control information between processors (such as microprocessors, communications and network processors, etc.), system memory, peripheral devices, and any other hardware components within a system. For example, communications fabric 608 can be implemented with one or more buses.

Memory 604 and persistent storage 610 are computer-readable storage media. In this embodiment, memory 604 includes random access memory (RAM). In general, memory 604 can include any suitable volatile or non-volatile computer readable storage media. Cache 606 is a fast memory that enhances the performance of processors 602 by holding recently accessed data, and data near recently accessed data, from memory 604.

Program instructions and data used to practice embodiments of the present invention may be stored in persistent storage 610 and in memory 604 for execution by one or more of the respective processors 602 via cache 606. In an embodiment, persistent storage 610 includes a magnetic hard disk drive. Alternatively, or in addition to a magnetic hard disk drive, persistent storage 610 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 610 may also be removable. For example, a removable hard drive may be used for persistent storage 610. Other examples include optical and magnetic disks, thumb drives, and smart cards that are inserted into a drive for transfer onto another computer-readable storage medium that is also part of persistent storage 610.

Communications unit 614, in these examples, provides for communications with other data processing systems or devices, including resources of network 120. In these examples, communications unit 614 includes one or more network interface cards. Communications unit 614 may provide communications through the use of either or both physical and wireless communications links. Program instructions and data used to practice embodiments of the present invention may be downloaded to persistent storage 610 through communications unit 614.

I/O interface(s) 612 allows for input and output of data with other devices that may be connected to computing device 600. For example, I/O interface 612 may provide a connection to external devices 616 such as a keyboard, keypad, a touch screen, and/or some other suitable input device. External devices 616 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 610 via I/O interface(s) 612. I/O interface(s) 612 also connect to a display 618.

Display 618 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, the method comprising:
    deploying a service portal in an infrastructure as a service (IaaS) environment, wherein the service portal stores a table mapping of a plurality of tenants, including a first tenant, and respectively corresponding service instances on a data store;
    intercepting, by the service portal, a tenant packet, directed to a first location, associated with the first tenant of the IaaS environment;
    identifying, by the service portal, based at least in part on the table mapping, the tenant packet, and a policy table, a subscription status and one or more identified services;
    transmitting, by the service portal, and based at least in part on the subscription status, the tenant packet to a second location for processing by the identified services;
    receiving, by the service portal, a processed tenant packet from the identified services; and
    transmitting, by the service portal, the processed tenant packet to the first location;

wherein:
  the table mapping: (i) maps incoming and outgoing service requests for the plurality of tenants, and (ii) includes tenant header information stripped from the tenant packet before the packet is delivered to one or more identified services; and
  the policy table specifies a service instance applicable to the tenant packet.

2. The method of claim 1, wherein the first location is a second tenant in the IaaS environment.

3. The method of claim 1, wherein the first location is the first tenant.

4. The method of claim 1, wherein analyzing the tenant packet to identify one or more services to which to transmit the tenant packet comprises:
  consulting the policy table, wherein the policy table comprises one or more policies corresponding to the one or more services; and
  determining the identified services based on the one or more policies.

5. The method of claim 1, further comprising:
  prior to transmitting the tenant packet to the second location for processing by the identified services, stripping a tenant header from the tenant packet; and
  prior to transmitting the processed tenant packet to the first location, adding the tenant header to the processed tenant packet.

6. The method of claim 1, wherein transmitting the tenant packet to the second location for processing by the identified services comprises:
  sending the tenant packet to a first service of the identified services at the second location;
  receiving the processed packet from the first service; and
  sending the processed packet to a second service of the identified services at a third location.

7. The method of claim 1, wherein transmitting the tenant packet to a second location for processing by the identified services comprises:
  sending the tenant packet to a first service of the identified services at the second location and a second service of the identified services at a third location;
  receiving a first processed tenant packet from the first service; and
  receiving a second processed tenant packet from the second service.

8. The method of claim 1, wherein the identified services are selected from the group consisting of: a captive portal, a traffic analyzer, and an encryption system.

9. A computer program product, the computer program product comprising:
  a computer readable storage medium, wherein the computer readable storage medium is not a transitory signal per se, and program instructions stored on the computer readable storage medium, the program instructions comprising:
    program instructions to deploy a service portal in an infrastructure as a service (IaaS) environment, wherein the service portal stores a table mapping of a plurality of tenants, including a first tenant, and respectively corresponding service instances on a data store;
    program instructions to intercept a tenant packet, directed to a first location, associated with the first tenant of the IaaS environment;
    program instructions to identify, by the service portal, based at least in part on the table mapping, the tenant packet, and a policy table, a subscription status and one or more identified services;
    program instructions to transmit, based at least in part on the subscription status, the tenant packet to a second location for processing by the identified services;
    program instructions to receive a processed tenant packet from the identified services; and
    program instructions to transmit the processed tenant packet to the first location;
  wherein:
    the table mapping: (i) maps incoming and outgoing service requests for the plurality of tenants, and (ii) includes tenant header information stripped from the tenant packet before the packet is delivered to one or more identified services; and
    the policy table specifies a service instance applicable to the tenant packet.

10. The computer program product of claim 9, wherein the first location is a second tenant in the IaaS environment.

11. The computer program product of claim 9, wherein the first location is the first tenant.

12. The computer program product of claim 9, wherein the program instructions to analyze the tenant packet to identify one or more services to which to transmit the tenant packet comprise:
  program instructions to consult the policy table, wherein the policy table comprises one or more policies corresponding to the one or more services; and
  program instructions to determine the identified services based on the one or more policies.

13. The computer program product of claim 9, wherein the program instructions stored on the computer readable storage medium further comprise:
  program instructions to, prior to transmitting the tenant packet to the second location for processing by the identified services, strip a tenant header from the tenant packet; and
  program instructions to, prior to transmitting the processed tenant packet to the first location, add the tenant header to the processed tenant packet.

14. The computer program product of claim 9, wherein the program instructions to transmit the tenant packet to the second location for processing by the identified services comprise:
  program instructions to send the tenant packet to a first service of the identified services at the second location;
  program instructions to receive the processed packet from the first service; and
  program instructions to send the processed packet to a second service of the identified services at a third location.

15. The computer program product of claim 9, wherein the program instructions to transmit the tenant packet to a second location for processing by the identified services comprise:
  program instructions to send the tenant packet to a first service of the identified services at the second location and a second service of the identified services at a third location;
  program instructions to receive a first processed tenant packet from the first service; and
  program instructions to receive a second processed tenant packet from the second service.

16. The computer program product of claim 9, wherein the identified services are selected from the group consisting of: a captive portal, a traffic analyzer, and an encryption system.

17. A computer system, the computer system comprising:
one or more computer processors;
one or more computer readable storage media, wherein the one or more computer readable storage media is not a transitory signal per se;
program instructions stored on the computer readable storage media for execution by at least one of the one or more processors, the program instructions comprising:
program instructions to deploy a service portal in an infrastructure as a service (IaaS) environment, wherein the service portal stores a table mapping of a plurality of tenants, including a first tenant, and respectively corresponding service instances on a data store;
program instructions to intercept a tenant packet, directed to a first location, associated with the first tenant of the IaaS environment;
program instructions to identify, by the service portal, based at least in part on the table mapping, the tenant packet, and a policy table, a subscription status and one or more identified services;
program instructions to transmit, based at least in part on the subscription status, the tenant packet to a second location for processing by the identified services;
program instructions to receive a processed tenant packet from the identified services; and
program instructions to transmit the processed tenant packet to the first location;
wherein:
the table mapping (i) maps incoming and outgoing service requests for the plurality of tenants, and (ii) includes tenant header information stripped from the tenant packet before the packet is delivered to one or more identified services; and
the policy table specifies a service instance applicable to the tenant packet.

18. The computer system of claim 17, wherein the first location is a second tenant in the IaaS environment.

19. The computer system of claim 17, wherein the first location is the first tenant.

20. The computer system of claim 17, wherein the program instructions to analyze the tenant packet to identify one or more services to which to transmit the tenant packet comprise:
program instructions to consult the policy table, wherein the policy table comprises one or more policies corresponding to the one or more services; and
program instructions to determine the identified services based on the one or more policies.

21. The computer system of claim 17, wherein the program instructions stored on the computer readable storage medium further comprise:
program instructions to, prior to transmitting the tenant packet to the second location for processing by the identified services, strip a tenant header from the tenant packet; and
program instructions to, prior to transmitting the processed tenant packet to the first location, add the tenant header to the processed tenant packet.

22. The computer system of claim 17, wherein the program instructions to transmit the tenant packet to the second location for processing by the identified services comprise:
program instructions to send the tenant packet to a first service of the identified services at the second location;
program instructions to receive the processed packet from the first service; and
program instructions to send the processed packet to a second service of the identified services at a third location.

23. The computer system of claim 17, wherein the program instructions to transmit the tenant packet to a second location for processing by the identified services comprise:
program instructions to send the tenant packet to a first service of the identified services at the second location and a second service of the identified services at a third location;
program instructions to receive a first processed tenant packet from the first service; and
program instructions to receive a second processed tenant packet from the second service.

24. The computer system of claim 17, wherein the identified services are selected from the group consisting of: a captive portal, a traffic analyzer, and an encryption system.

* * * * *